(12) United States Patent
Goodwin et al.

(10) Patent No.: US 9,774,372 B1
(45) Date of Patent: Sep. 26, 2017

(54) TECHNIQUES FOR SHARING DOCUMENTS STORED AT A REMOTE FILE STORAGE SERVER USING SHORT RANGE WIRELESS COMMUNICATION-ENABLED COMPUTING DEVICES (71) Applicant: Google Inc., Mountain View, CA (US)

(72) Inventors: Bruce Lewis Goodwin, Bryn Mawr, PA (US); Shrikant Ravindra Shanbhag, Jersey City, NJ (US)

(73) Assignee: GOOGLE INC., Mountain View, CA (US)

( * ) Notice: Subject to any disclaimer, the term of this patent is extended or adjusted under 35 U.S.C. 154(b) by 573 days.

(21) Appl. No.: 13/970,222

(22) Filed: Aug. 19, 2013

(51) Int. Cl.
H04B 5/00 (2006.01)
(52) U.S. Cl.
CPC ................... *H04B 5/0031* (2013.01)
(58) Field of Classification Search
None
See application file for complete search history.

(56) References Cited

U.S. PATENT DOCUMENTS

| 7,206,806 | B2 | 4/2007 | Pineau |
| 2003/0182587 | A1* | 9/2003 | Morrison et al. ............. 713/202 |
| 2006/0143477 | A1 | 6/2006 | Stevens |
| 2009/0132542 | A1 | 5/2009 | Xu |
| 2009/0300109 | A1 | 12/2009 | Porter |
| 2010/0081385 | A1* | 4/2010 | Lin et al. .................... 455/41.3 |
| 2010/0254631 | A1 | 10/2010 | Chien et al. |

* cited by examiner

Primary Examiner — Hsin-Chun Liao
(74) Attorney, Agent, or Firm — RMCK Law Group, PLC (57) ABSTRACT A computer-implemented technique can include receiving, at a first computing device including one or more processors, a request to share a document stored at a remote file storage server. The first computing device can establish a short range wireless communication link with a second computing device associated with an intended recipient of the document. The first computing device can obtain an identifier for the intended recipient from the second computing device using the short range wireless communication link. The first computing device can associate the identifier with the request and can then transmit the request to the remote file storage server. The request can cause the remote file storage server to provide the intended recipient with access to the document via the second computing device.

20 Claims, 5 Drawing Sheets

TECHNIQUES FOR SHARING DOCUMENTS STORED AT A REMOTE FILE STORAGE SERVER USING SHORT RANGE WIRELESS COMMUNICATION-ENABLED COMPUTING DEVICES

FIELD

The present disclosure relates to short range wireless communication (such as near field communication or "NFC") and, more particularly, to techniques for sharing documents stored at a remote file storage server using short range wireless communication-enabled computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Sharing documents stored at remote file storage (or file hosting) servers can be a cumbersome process when using input methods currently available on computing devices. Short range wireless communication (such as near field communication or "NFC") technology is becoming more prevalent in mobile computing devices entering the marketplace. Communication data links are established between two computing devices over a short distance when the two devices are brought within close proximity to each other. Once a data link has been established, the two computing devices can share data over the communication link.

SUMMARY

A computer-implemented technique is presented. The technique can include receiving, at a first computing device including one or more processors, a request to share a document stored at a remote file storage server, the request including a document identifier for the document. The technique can include establishing, at the first computing device, a short range wireless communication link with a second computing device associated with an intended recipient of the document. The technique can include requesting, from the first computing device, a recipient identifier for the intended recipient from the second computing device via the short range wireless communication link. The technique can include receiving, at the first computing device, the recipient identifier from the second computing device via the short range wireless communication link in response to the requesting. The technique can include associating, at the first computing device, the recipient identifier with the request. The technique can also include transmitting, from the first computing device, the request to the remote file storage server, wherein the request includes the recipient identifier, and wherein the request causes the remote file storage server to provide the intended recipient with access to the document via the second computing device.

In some embodiments, the technique further includes: executing, at the first computing device, a data sharing application to access the remote file storage server, and receiving, at the first computing device, a selection of the document at the remote file storage server via the data sharing application.

In other embodiments, the request to share the document is received in response to receiving the selection of the document.

In some embodiments, the technique further includes receiving, at the first computing device, a type of access for sharing the document, wherein the request to share the document is received in response to receiving the selection of the document and the type of access for sharing the document, and wherein the request to share the document further includes the type of access for sharing the document.

In other embodiments, the type of access for sharing the document is at least one of (i) read-only access, (ii) read-write access, and (iii) execute access.

In some embodiments, the technique further includes: establishing, at the first computing device, a short range wireless communication link with a plurality of computing devices, each of the plurality of computing devices being associated with a potential recipient of the document, and outputting, at the first computing device, a list of the potential recipients on a display of the first computing device.

In other embodiments, the technique further includes: receiving, at the first computing device, a selection of one or more potential recipients for the document from the list of the potential recipients to obtain one or more selected recipients, and transmitting, from the first computing device, the request to share the document to the remote file storage server, wherein the request to share the document includes a specific recipient identifier for each of the one or more selected recipients, and wherein the request causes the remote file storage server to provide access to the one or more selected recipients with access to the document via their one or more computing devices, respectively.

In some embodiments, the recipient identifier is defined as at least one of (i) an email address for the intended recipient and (ii) a network address associated with the second computing device.

In other embodiments, requesting the recipient identifier is initiated in response to establishing the short range wireless communication link between the first computing device and the second computing device.

In some embodiments, establishing the short range wireless communication link between the first computing device and the second computing device is performed based on the ISO/IEC 18092 standard.

A non-transitory, computer-readable medium is also presented. The computer-readable medium can have instructions stored thereon, which, when executed by one or more processors of a first computing device, can cause the first computing device to perform operations. The operations can include receiving a request to share a document stored at a remote file storage server, the request including a document identifier for the document. The operations can include establishing a short range wireless communication link with a second computing device associated with an intended recipient of the document. The operations can include requesting a recipient identifier for the intended recipient from the second computing device via the short range wireless communication link. The operations can include receiving the recipient identifier from the second computing device via the short range wireless communication link in response to the requesting. The operations can include associating the recipient identifier with the request. The operations can also include transmitting the request to the remote file storage server, wherein the request includes the recipient identifier, and wherein the request causes the remote file storage server to provide the intended recipient with access to the document via the second computing device.

In some embodiments, the operations further include: executing a data sharing application to access the remote file storage server, and receiving a selection of the document at the remote file storage server via the data sharing application.

In other embodiments, the request to share the document is received in response to receiving the selection of the document.

In some embodiments, the operations further comprise include receiving a type of access for sharing the document, wherein the request to share the document is received in response to receiving the selection of the document and the type of access for sharing the document, and wherein the request to share the document further includes the type of access for sharing the document.

In other embodiments, the type of access for sharing the document is at least one of (i) read-only access, (ii) read-write access, and (iii) execute access.

In some embodiments, the operations further include: establishing a short range wireless communication link with a plurality of computing devices, each of the plurality of computing devices being associated with a potential recipient of the document, and outputting a list of the potential recipients on a display of the first computing device.

In other embodiments, the operations further include: receiving a selection of one or more potential recipients for the document from the list of the potential recipients to obtain one or more selected recipients, and transmitting the request to share the document to the remote file storage server, wherein the request to share the document includes a specific recipient identifier for each of the one or more selected recipients, and wherein the request causes the remote file storage server to provide access to the one or more selected recipients with access to the document via their one or more computing devices, respectively.

In some embodiments, the recipient identifier is defined as at least one of (i) an email address for the intended recipient and (ii) a network address associated with the second computing device.

In other embodiments, requesting the recipient identifier is initiated in response to establishing the short range wireless communication link between the first computing device and the second computing device.

In some embodiments, establishing the short range wireless communication link between the first computing device and the second computing device is performed based on the ISO/IEC 18092 standard.

Further areas of applicability of the present disclosure will become apparent from the detailed description provided hereinafter. It should be understood that the detailed description and specific examples are intended for purposes of illustration only and are not intended to limit the scope of the disclosure.

DRAWINGS

The present disclosure will become more fully understood from the detailed description and the accompanying drawings, wherein.

DETAILED DESCRIPTION

Figure 1:
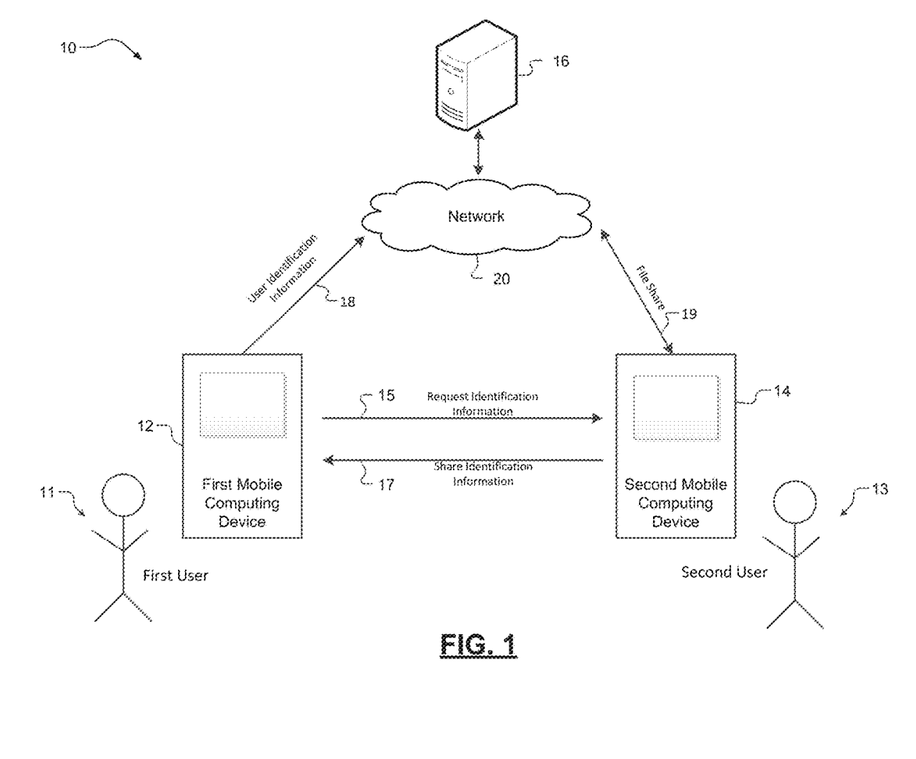
FIG. 1 is a diagram depicting a short range wireless communication system including a first example computing device according to the some implementations of the present disclosure.

FIG. 1 depicts an example file sharing system 10. The file sharing system 10 generally includes a first mobile computing device 12 and a second mobile computing device 14, which are operated and transported by a first user 11 and a second user 13, respectively. While two mobile computing devices 12, 14 are shown, one or both of the mobile computing devices 12, 14 may be a non-portable or stationary computing device. At least one of the two computing devices, however, is typically a mobile computing device (a laptop computer, a tablet computer, a mobile phone, etc.) because one of the computing devices is brought into range for short range wireless communication (such as NFC) with the other computing device.

The file sharing system 10 also includes a file storage server 16 located remotely from the mobile computing devices 12, 14. The file storage server 16 can be accessed by the first mobile computing device 12 and/or the second mobile computing device 14 via a network 20. The network 20 can include a local area network (LAN), a wide area network (WAN), e.g., the Internet, or a combination thereof. The file storage server 16 can be configured to store a plurality of user data files. In some implementations, the file storage server 16 may be a cluster of two or more servers operating in a parallel or distributed architecture. For example, the first user 11 may upload one or more data files from the first mobile computing device 12 to the file storage server 16 for storage, or create one or more data files at the file storage server 16 from the first mobile computing device 12. The data files are in turn accessible from other computing devices, such as the second mobile computing device 14.

In some embodiments, the first mobile computing device 12 and the second mobile computing device 14 communicate via an NFC data link. NFC is a short-range wireless technology that operates over short distances, for example, less than 20 centimeters. In one embodiment, NFC is established in accordance with communication protocols defined in the ISO/IEC 18092 standard as set forth by the International Standard Organization. While reference is made to NFC, it is understood that concepts described herein are extendable to other types of short-range wireless connectivity technology (Bluetooth, WiFi Direct, etc.). Thus, while the description below is primarily directed to NFC, it should be appreciated that alternative forms of short range wireless communication could be utilized as the present disclosure is equally applicable to any type of short range wireless communication protocol.

In general, NFC data links are established between two NFC-configured devices when the two devices are brought within close proximity to each other. In order to establish NFC between the first mobile computing device 12 and the second mobile computing device 14, the first mobile computing device 12 (the "initiator") initiates communication with the second mobile computing device 14 (the "target"). To do so, the first mobile computing device 12 may generate an electromagnetic field (not shown) using radio frequency (RF) waves. For example, the RF waves may have a frequency of approximately 13.56 megahertz (MHz) within a bandwidth of approximately 14 kilohertz (kHz), although other frequency ranges are contemplated by this disclosure.

Communication between the two computing devices may follow one of two modes of operation: passive mode and active mode. In passive mode, only one computing device, e.g., the second mobile computing device 14, generates a radio field, while the other computing device, e.g., the first mobile computing device 12, uses load modulation to transfer data. In active mode, both computing devices, e.g., the first and second mobile computing devices 12, 14, generate their own radio fields to transmit data. Thus, in either mode, a data link is established between the two computing devices, e.g., the first and second mobile computing devices 12, 14 as shown in FIG. 1.

In an example embodiment, the first user 11 interacts with a data sharing application that allows the first user 11 to grant access to files at the file storage server 16 to the second user 13. More specifically, the first mobile computing device 12 can grant access to files at the file storage server 16 to the second mobile computing device 14. For example, the first user 11 may execute an application on the first mobile computing device 12 to access the file storage server 16. The first user 11 may identify a file hosted by the file storage server 16 that the first user 11 has permission to share with other users. The first user 11 may elect to grant access to the file to the second user 13 via the second mobile computing device 14. For example, the first user 11 may grant the second user 13 read-only access, read-write access, or execute access to the file hosted by the file storage server 16. It should be appreciated that the second user 13 can be granted other types of access, e.g., the ability to see that a file exists without being able to read its contents, and/or more than one type of access, e.g., read-only and execute.

To grant access to a data file, the first user 11 may obtain identification information from the second user 13 via the second mobile computing device 14. The identification information related to the second user 13 may include, but is not limited to, the name of the second user 13, an email address, a network address of the second mobile computing device 14, or randomly generated authorization data. The first user 11 can then associate the identification information with the file to be shared with the second user 13 via the second mobile computing device 14.

In some embodiments, the identification information is sought by the first user 11 from the second user 13. For example, the data sharing application on the first mobile computing device 12 may send a request for identification information to the second mobile computing device 14 as indicated at 15. The request for identification may be received by a data sharing application residing on the second mobile computing device 14. In response to the request for identification information, the data sharing application on the second mobile computing device 14 sends identification information for the second user 13 to the first mobile computing device 12 as indicated at 17. The data exchange between the two mobile computing devices may occur over the NFC data link, which was initiated by bringing the two mobile computing devices in close proximity to each other.

It is envisioned that the data exchange may occur over other types of short-range wireless connectivity technology (Bluetooth, WiFi Direct, etc.).

In other embodiments, the second user 13 may initiate the file sharing. For example, the second user 13 may request permission to access a particular data file by sending a request via the second mobile computing device 14 for access to the first user 11 at the first mobile computing device 12, where the request indicates that the second user 13 desires access to the particular data file and includes identification information for the second user 13. The first user 11 can in turn interact with the data sharing application at the first mobile computing device 12 to grant access to the data file to the second user 13 via the second mobile computing device 14. Again, the data exchange between the two mobile computing devices 12, 14 may occur over the NFC data link, which was initiated by bringing the two mobile computing devices in close proximity to each other.

In either case, the data sharing application on the first mobile computing device 12 sends a request to share the data file at 18 to the file storage server 16. The request to share the data file includes identifying information for the file to be shared (e.g., a document identifier or file identifier) along with the identification information for the second user 13 or the second mobile computing device 14 (e.g., a recipient identifier). The request to share the data file may also include the type of access being granted to the second user 13. The file storage server 16 in turn associates the identification information for the second user 13 and the access granted to the second user 13 with the particular data file to be shared with the second user 13. The second user 13 may then access the particular data file at the file storage server 16 as indicated at 19.

Figure 2:
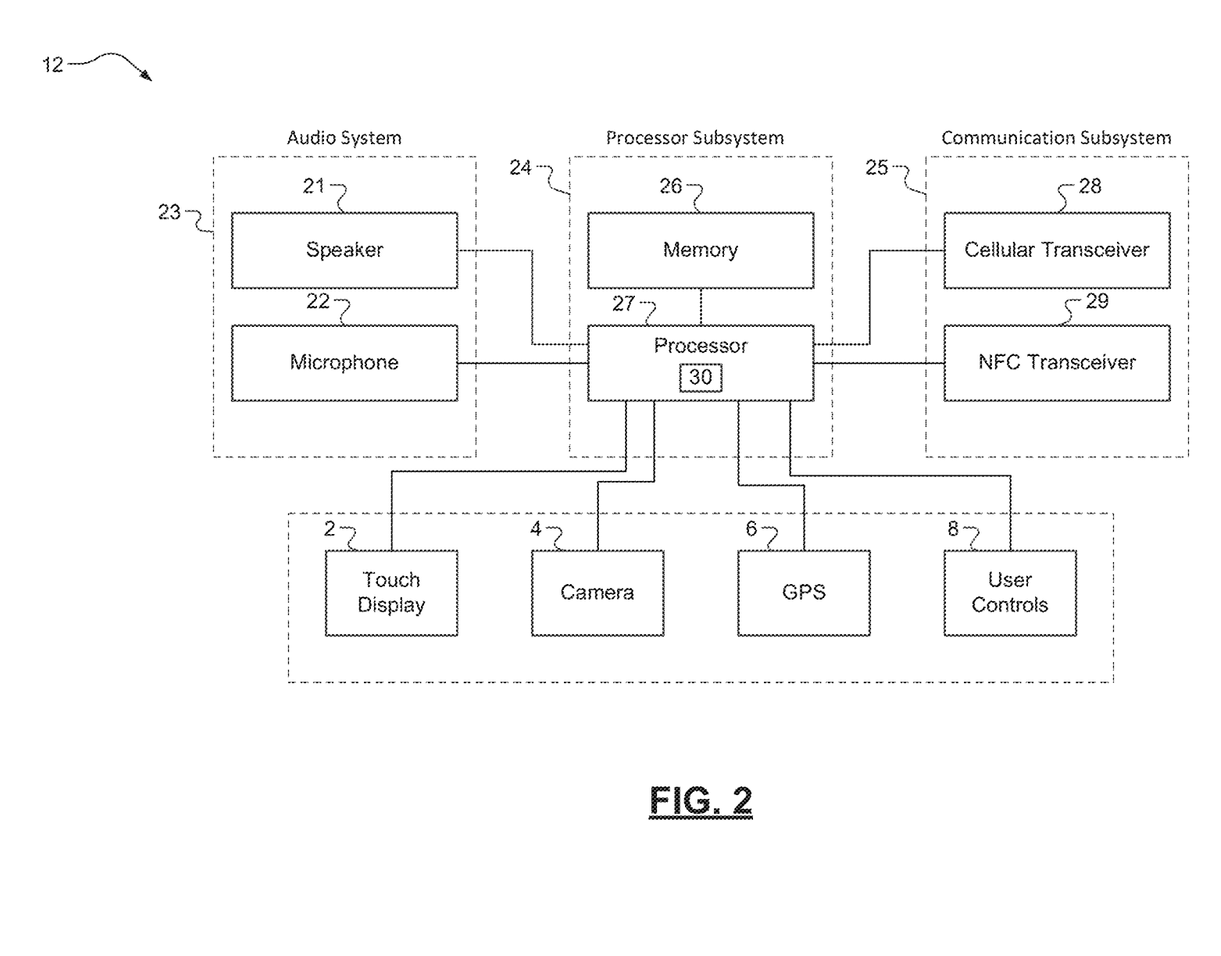
FIG. 2 is a diagram depicting the first example computing device of FIG. 1 including a computer processor having an example software architecture according to some implementations of the present disclosure.

FIG. 2 depicts an example of the first mobile computing device 12. The first mobile computing device 12 is comprised generally of: an audio subsystem 23, a processor subsystem 24, and a communication subsystem 25. Example components of these subsystems are further described below. While context is provided with reference to a mobile phone, it is readily understood that the techniques described herein may be implemented in other types of NFC-enabled devices (a laptop computer, a tablet computer, etc.).

The audio subsystem 23 can include a microphone 22 for capturing audio input from an operator of the first mobile computing device 12, e.g., the first user 11, and a speaker 21 for outputting audio data to the operator. The communication subsystem 25 includes one or more transceivers or connectivity interfaces. Cellular transceiver 28 is one example type of connectivity interface. NFC transceiver 29 is another example type of connectivity interface. Protocols for establishing an NFC link between devices are handled by the NFC transceiver 29. Integrated circuits for implementing the NFC transceiver 29 are commercially available. Other types of wireless interfaces (such as satellite, Bluetooth, and WiFi Direct) may be included but are not shown.

During operation, speech input captured by the microphone 22 is converted to a suitable data form by the processor subsystem 24 before being passed along to the communication subsystem 25 for transmission. Likewise, incoming signals received by the communication subsystem 25 are passed along for processing to the processor subsystem 24. Overall operation and control of the first mobile computing device 12 may also be carried out by the processor subsystem 24, including the techniques for sharing application data over an NFC link as described herein. The processor subsystem 24 includes a processor 27 and memory 26. It should be appreciated that the term "processor" as used herein can refer to one or more processors operating in a parallel or distributed architecture. The processor 27 can include a software architecture 30, e.g., a set of instructions for execution by the processor 27. The memory 26 can include any suitable storage medium (flash, hard disk, etc.).

The processor subsystem 24 may also be interfaced with other peripheral components. Example peripheral components include a touch sensitive display 2, a camera 4, a global positioning system (GPS) 6, as well as user controls 8, such as on/off buttons or volume controls. It is to be understood that components relevant to this discourse are discussed above, but that other known components, e.g., a battery, may be needed to control and manage the overall operation of the first mobile computing device 12. Within the broader aspects of the disclosure, it is also envisioned that these peripheral components may be arranged in other varying configurations.

Figure 3:
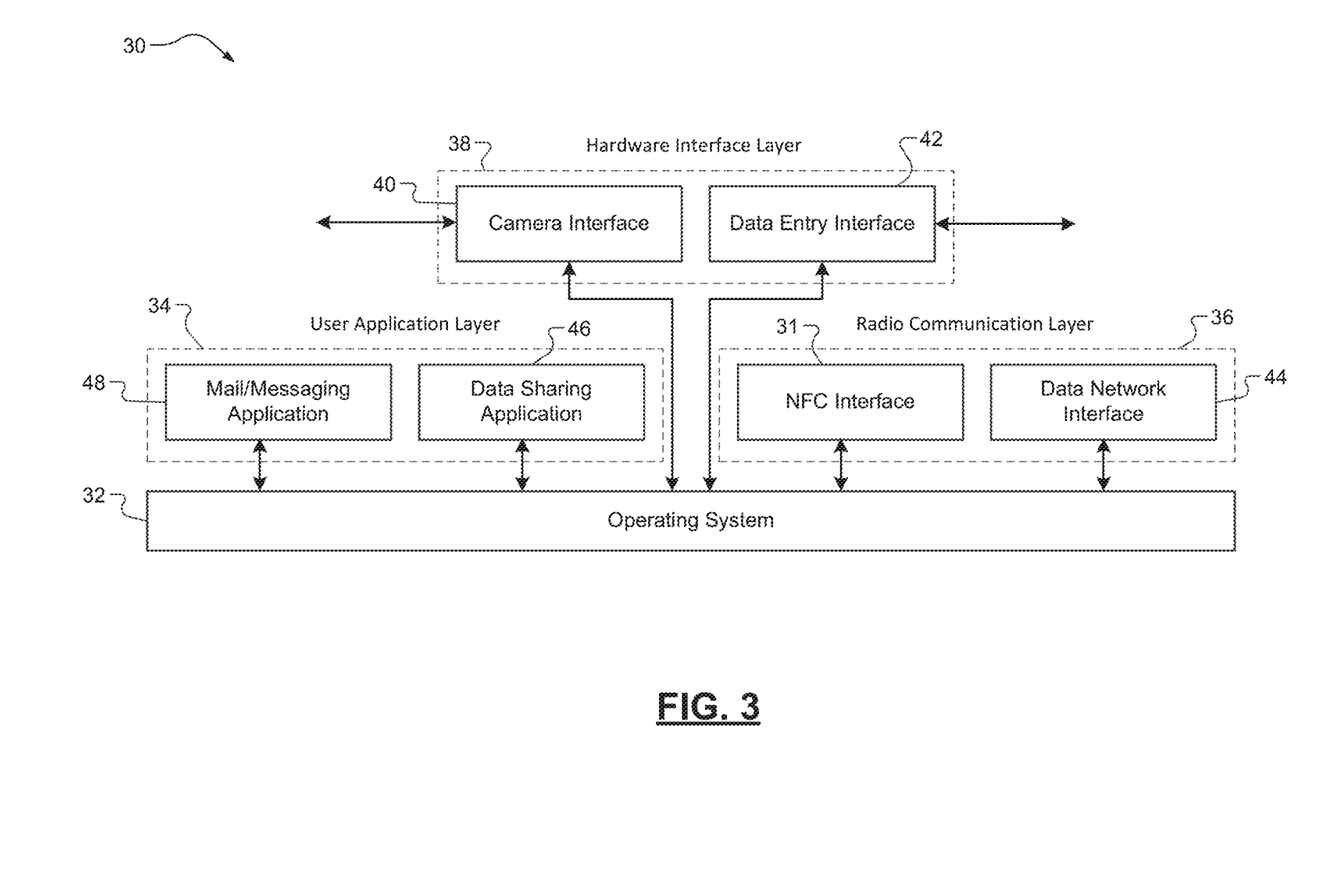
FIG. 3 is a diagram depicting the example software architecture of the computer processor of FIG. 2.

FIG. 3 illustrates an example of the software architecture 30. Components comprising the software architecture 30 may include an operating system 32, a user application layer 34, a radio communication layer 36, and a hardware interface layer 38. In an exemplary embodiment, these components are implemented as computer executable instructions executed by the processor 27. It should be appreciated that one or more of these components can be implemented as one or more modules of the processor 27. Each of the components is further described below.

The hardware interface layer 38 functions as an interface with the operating system 32 and various hardware components, for example the camera 4. When a user, such as the first user 11, initiates a camera interface 40, the camera interface 40 communicates with the operating system 32 and the camera 4 to allow the first user 11 to operate the camera 4. While only a camera interface 40 is described, the hardware interface layer 38 may be arranged to include varying hardware interface components, for example a data entry interface 42. The data entry interface 42 may function as an interface with the operating system 32 and a hardware component that a user may use to input data, for example, the touch display 2.

The user application layer 34 functions as an interface with the operating system 32 and various applications, for example a data sharing application 46. Data sharing application 46 implements the functionality needed to interface with the file storage server 16, including the techniques for sharing data files described herein (such as those described below in relation to FIGS. 4-5). For brevity, other techniques used to interface with the file storage server 16 have been omitted from this disclosure. While a data sharing application 46 is described in detail, it is envisioned that the user application layer 34 may include a variety of user applications, such as a mail/messaging application 48.

The radio communication layer 36 functions as an interface with the operating system 32 and various radios, for example an NFC interface 31. The NFC interface 31 functions as an interface with the NFC transceiver 29. When two NFC-enabled computing devices come within range of each other, the NFC transceiver 29 operates to establish an NFC data link between the two NFC-enabled computing devices, e.g., the first and second mobile computing devices 12, 14. Once established, the NFC transceiver 29 sends a notification message of the link to the NFC interface 31.

The NFC interface 31, in turn, initiates one or more techniques for sharing data via the NFC link. For example, the NFC interface 31 interacts with the data sharing application 46 to request identification information from another computing device via the NFC link. While only the NFC interface 31 is described, it is envisioned that the radio communications layer 36 may be arranged to include various wireless communications components such as a data network interface 44, e.g., to be used for Bluetooth, WiFi Direct, and the like. The data network interface 44 may access the operating system 32 and the cellular transceiver 28.

Figure 4:
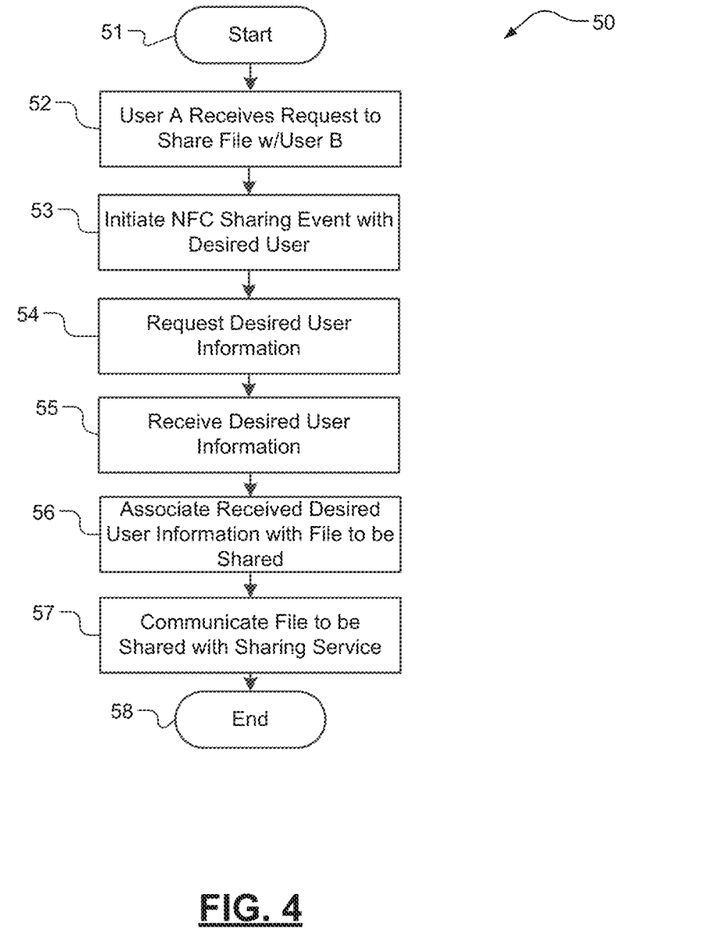
FIG. 4 is a flowchart illustrating an example technique for associating content shared over an NFC link established between two NFC-enabled computing devices according to some implementations of the present disclosure.

FIG. 4 illustrates an example technique 50 for sharing data files residing at a remotely-located file storage server using data shared between NFC-enabled computing devices. The technique 50 begins at 51. User A, e.g., the first user 11, may initiate a data sharing application, e.g., data sharing application 46, on user A's NFC-enabled computing device, e.g., the first mobile computing device 12. The data sharing application 46 may be used to communicate user A's desire to give access to the data file to user B, e.g., the second user 13, to the remotely-located file storage server, e.g., file storage server 16. User A receives a request from a user B to share a data file stored on the remotely-located file storage server with user B at 52. For example, user A may receive an email from user B indicating user B's desire to access the data file stored on the remotely located file storage server. While an email request from user B is described, it is envisioned that any other form of communication may be used.

Further, while a request by user B to be granted access to a data file is described, it is also envisioned that user A may request to share a data file with user B. For example, user A may desire to share a data file on the remotely located file storage service with user B. User A may initiate the data sharing application on user A's NFC-enabled computing device. User A may then communicate to the data sharing application user A's desire to share a file. An NFC interface, e.g., NFC interface 31, establishes an NFC data link at 53 when user A's NFC-enabled computing device comes within range of user B's NFC-enabled computing device. Upon establishing the NFC data link, user A touches, or brings within close proximity, user A's NFC-enabled computing device to/with user B's NFC-enabled device. The NFC interface requests identification information from user B at 54. Upon receiving the request for identification information, user B may respond to the request by acknowledging a notification on user B's NFC-enabled computing device.

The NFC interface receives the requested identification information from user B at 55. The identification information may include, but is not limited to, user B's name, user B's mobile phone number, user B's mobile device's network address, or randomly generated authorization data. The sharing application receives the identification information from the NFC interface. The data sharing application may recognize the data format of the identification information and associate the identification information with the selected file to be shared with user B at 56. Upon associating the identification information with the file to be shared, the data sharing application communicates the access granted to user B with the remotely-located file storage server at 57. The data sharing application may send a signal to the remotely-located file storage server indicating the file to be shared, user B's identification information, and the access that user A desires to grant to user B. User B may then access the file on the remotely-located file storage server based on the access granted by user A. The technique 50 can then end at 58 or return to 52 for one or more additional cycles.

Figure 5:
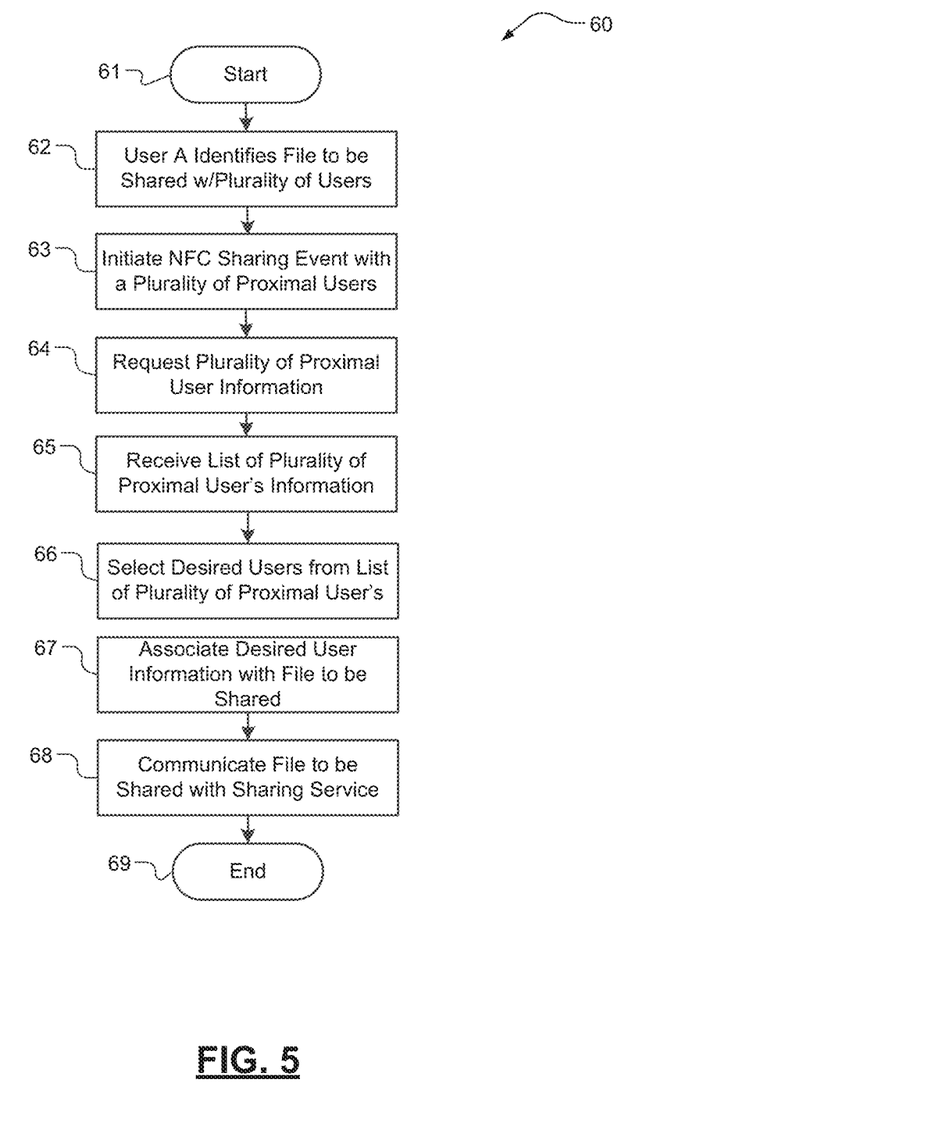
FIG. 5 is a flowchart illustrating another example technique for associating content shared over an NFC link established between two NFC-enabled computing devices according to some implementations of the present disclosure.

FIG. 5 illustrates another example technique 60 for sharing data files residing at a remotely-located file storage server using data shared between NFC-enabled computing devices, which begins at 61. A user A, e.g., the first user 11, identifies a file to be shared with a plurality of users, e.g., including the second user 13, at 62. User A initiates a data sharing application, e.g., data sharing application 46, on user A's NFC-enabled computing device, e.g., the first mobile computing device 12. The data sharing application can be used to communicate user A's desire to give access to the file to a plurality of desired users to the remotely-located file storage server, e.g., file storage server 16.

An NFC interface, e.g., NFC interface 31, establishes an NFC data link at 63 when user A's NFC-configured device comes within range of one or more of a plurality of proximal users' NFC-configured devices, e.g., the second mobile computing device 14. For example, user A's NFC-configured device touches, or is brought within close proximity to, one or more of the plurality of proximal users' NFC-configured devices. Upon establishing an NFC link, the NFC interface requests identification information from the one or more of the plurality of proximal users at 64. Upon receiving the request for identification information, the one or more of the plurality of proximal users may respond to the request by acknowledging a notification on each user's NFC-enabled device. For example, the one or more of the plurality of proximal users may acknowledge the notification by providing user identification information. Alternatively, for example, the one or more of the plurality of proximal users may acknowledge the notification by rejecting the request.

The NFC interface receives the requested identification information from the one or more of the plurality of proximal users at 65. The identification information may include, but is not limited to, the at least one of the one or more of the plurality of proximal user name(s), mobile phone number(s), mobile devices network address(es), or randomly generated authorization data. Upon receiving the requested identification information, user A may select desired user(s) from a list of the one or more proximal users at 66. At 67, the data sharing application associates the selected user's identification information with the file to be shared. The NFC interface communicates the identification information to the data sharing application. The data sharing application recognizes the data format of the identification information and associates the identification information with the selected file to be shared.

Upon associating the identification information with the file to be shared, the data sharing application communicates the access granted to the selected user(s) with the remotely-located file storage server at 68. The data sharing application sends a signal to the remotely-located file storage server indicating the file to be shared, the selected user's/users' identification information, and the access that user A desires to grant to the selected user(s). The selected user(s) may then access the file on the remotely-located file storage server based on the access granted by user A. The technique 60 can then end at 69 or return to 61 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
   receiving, at a first computing device including one or more processors, a request to share a document stored at a remote file storage server, the request including a document identifier for the document and a type of access for sharing the document;
   establishing, at the first computing device, a short range wireless communication link with a second computing device associated with an intended recipient of the document;
   requesting, from the first computing device, a recipient identifier for the intended recipient from the second computing device via the short range wireless communication link;
   receiving, at the first computing device, the recipient identifier from the second computing device via the short range wireless communication link in response to the requesting;
   associating, at the first computing device, the recipient identifier with the request; and
   transmitting, from the first computing device, the request to the remote file storage server, wherein the request includes the recipient identifier and the type of access for sharing the document, and wherein the request causes the remote file storage server to provide the intended recipient with the type of access to the document via the second computing device.

2. The computer-implemented method of claim 1, further comprising:
   executing, at the first computing device, a data sharing application to access the remote file storage server; and
   receiving, at the first computing device, a selection of the document at the remote file storage server via the data sharing application.

3. The computer-implemented method of claim 2, wherein the request to share the document is received in response to receiving the selection of the document.

4. The computer-implemented method of claim 1, wherein the type of access for sharing the document is at least one of (i) read-only access, (ii) read-write access, and (iii) execute access.

5. The computer-implemented method of claim 1, further comprising:
   establishing, at the first computing device, a short range wireless communication link with a plurality of computing devices, each of the plurality of computing devices being associated with a potential recipient of the document; and
   outputting, at the first computing device, a list of the potential recipients on a display of the first computing device.

6. The computer-implemented method of claim 5, further comprising:
   receiving, at the first computing device, a selection of one or more potential recipients for the document from the list of the potential recipients to obtain one or more selected recipients; and
   transmitting, from the first computing device, the request to share the document to the remote file storage server, wherein the request to share the document includes a specific recipient identifier for each of the one or more selected recipients, and wherein the request causes the remote file storage server to provide access to the one or more selected recipients with access to the document via their one or more computing devices, respectively.

7. The computer-implemented method of claim 1, wherein the recipient identifier is defined as at least one of (i) an email address for the intended recipient and (ii) a network address associated with the second computing device.

8. The computer-implemented method of claim 1, wherein requesting the recipient identifier is initiated in response to establishing the short range wireless communication link between the first computing device and the second computing device.

9. The computer-implemented method of claim 1, wherein establishing the short range wireless communication link between the first computing device and the second computing device is performed based on the ISO/IEC 18092 standard.

10. The computer-implemented method of claim 1, wherein the recipient identifier for the intended recipient comprises randomly generated authorization data.

11. A non-transitory, computer-readable medium having instructions stored thereon, which, when executed by one or more processors of a first computing device, cause the first computing device to perform operations comprising:
  receiving a request to share a document stored at a remote file storage server, the request including a document identifier for the document and a type of access for sharing the document;
  establishing a short range wireless communication link with a second computing device associated with an intended recipient of the document;
  requesting a recipient identifier for the intended recipient from the second computing device via the short range wireless communication link;
  receiving the recipient identifier from the second computing device via the short range wireless communication link in response to the requesting;
  associating the recipient identifier with the request; and
  transmitting the request to the remote file storage server, wherein the request includes the recipient identifier and the type of access for sharing the document, and wherein the request causes the remote file storage server to provide the intended recipient with the type of access to the document via the second computing device.

12. The computer-readable medium of claim 11, wherein the operations further comprise:
  executing a data sharing application to access the remote file storage server; and
  receiving a selection of the document at the remote file storage server via the data sharing application.

13. The computer-readable medium of claim 12, wherein the request to share the document is received in response to receiving the selection of the document.

14. The computer-readable medium of claim 11, wherein the type of access for sharing the document is at least one of (i) read-only access, (ii) read-write access, and (iii) execute access.

15. The computer-readable medium of claim 11, wherein the operations further comprise:
  establishing an short range wireless communication link with a plurality of computing devices, each of the plurality of computing devices being associated with a potential recipient of the document; and
  outputting a list of the potential recipients on a display of the first computing device.

16. The computer-readable medium of claim 15, wherein the operations further comprise:
  receiving a selection of one or more potential recipients for the document from the list of the potential recipients to obtain one or more selected recipients; and
  transmitting the request to share the document to the remote file storage server, wherein the request to share the document includes a specific recipient identifier for each of the one or more selected recipients, and wherein the request causes the remote file storage server to provide access to the one or more selected recipients with access to the document via their one or more computing devices, respectively.

17. The computer-readable medium of claim 11, wherein the recipient identifier is defined as at least one of (i) an email address for the intended recipient and (ii) a network address associated with the second computing device.

18. The computer-readable medium of claim 11, wherein requesting the recipient identifier is initiated in response to establishing the short range wireless communication link between the first computing device and the second computing device.

19. The computer-readable medium of claim 11, wherein establishing the short range wireless communication link between the first computing device and the second computing device is performed based on the ISO/IEC 18092 standard.

20. The computer-readable medium of claim 11, wherein the recipient identifier for the intended recipient comprises randomly generated authorization data.

* * * * *